(No Model.) 2 Sheets—Sheet 1.

E. P. HUNT.
FILTER.

No. 504,434. Patented Sept. 5, 1893.

Witnesses:
Emil Neuhart
Chas. F. Burkhardt

Edward P. Hunt, Inventor.
By Wilhelm Bonner,
Attorneys.

(No Model.) 2 Sheets—Sheet 2.
E. P. HUNT.
FILTER.
No. 504,434. Patented Sept. 5, 1893.
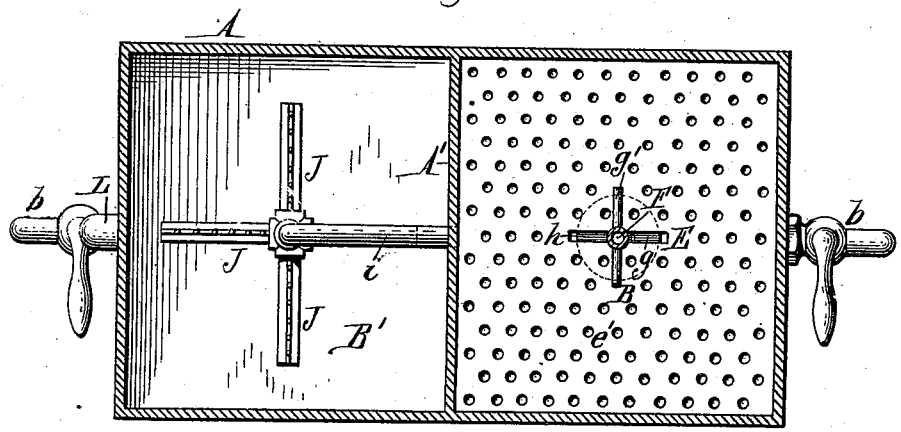
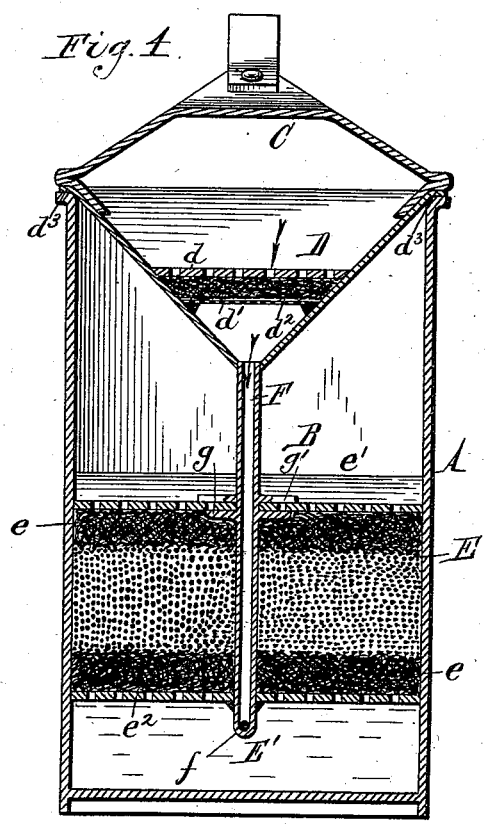
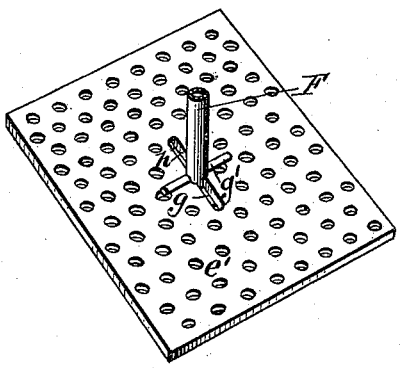
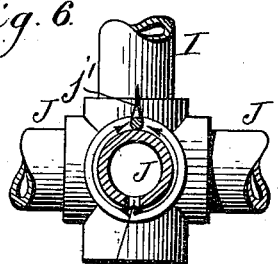
Witnesses: Edward P. Hunt, Inventor.
Emil Neuhart
Chas. F. Burkhardt
By Wilhelm Bonner
Attorneys

UNITED STATES PATENT OFFICE.

EDWARD PECK HUNT, OF BUFFALO, NEW YORK, ASSIGNOR TO JAMES H. FINLEY AND JAMES MURPHY, OF SAME PLACE.

FILTER.

SPECIFICATION forming part of Letters Patent No. 504,434, dated September 5, 1893.

Application filed November 4, 1892. Serial No. 450,929. (No model.)

*To all whom it may concern:*

Be it known that I, EDWARD PECK HUNT, a citizen of the United States, residing at Buffalo, in the county of Erie and State of New York, have invented new and useful Improvements in Filters, of which the following is a specification.

My invention relates more especially to a filter designed for purifying lubricating oil which is laden with foreign impurities, such as dust, particles of metal, &c.

The object of my invention is to produce an efficient filter of this class whereby a thorough cleansing of the oil is effected and in which access to the filtering medium is readily had, so that the same, as well as the filtering chambers, can be conveniently cleansed.

Figure 1:
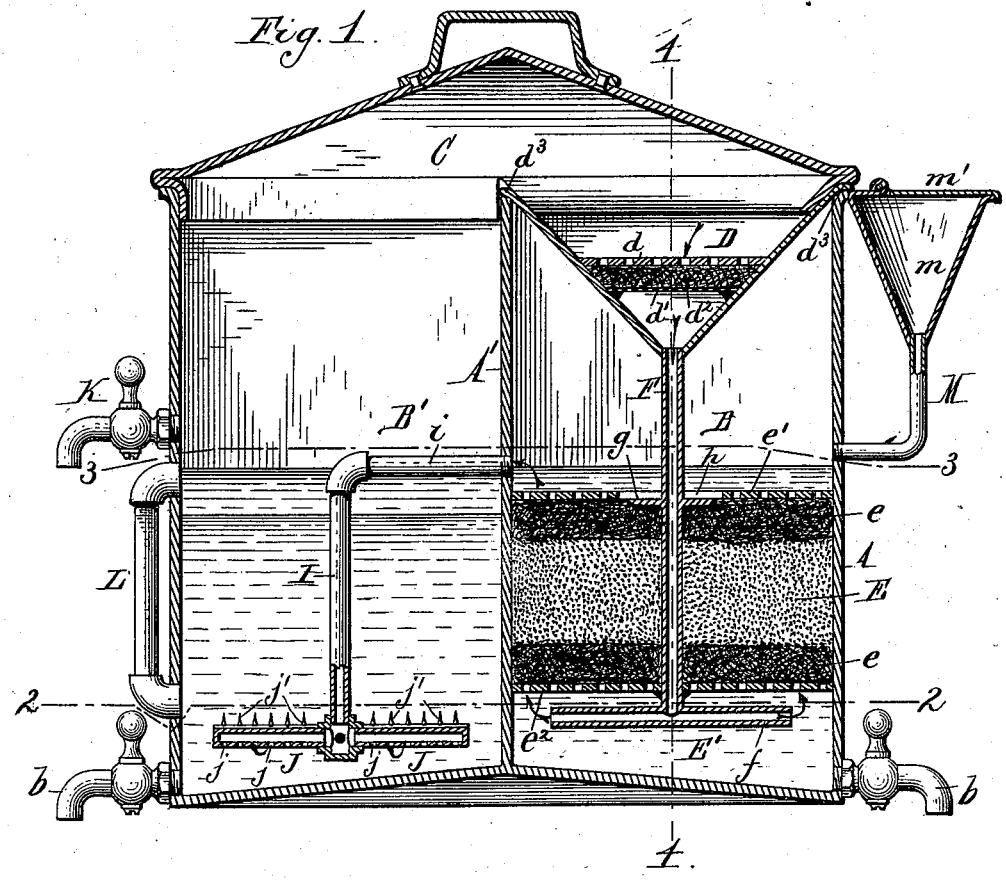
Figure 2:
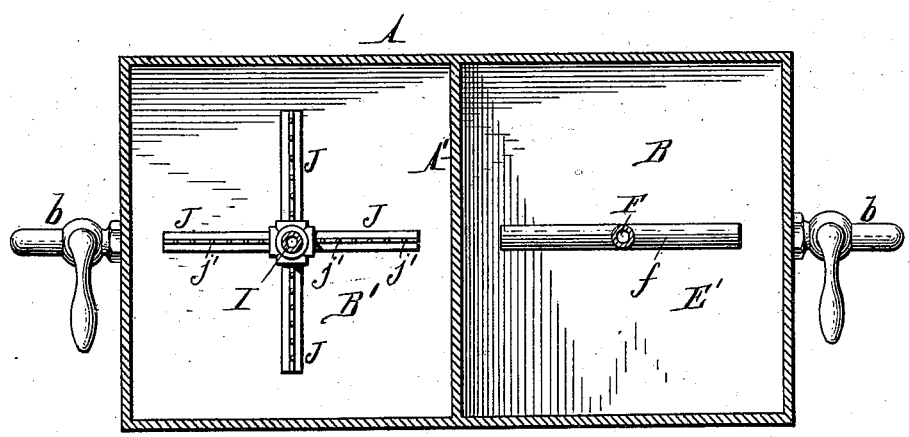

In the accompanying drawings consisting of two sheets:—Figure 1 is a longitudinal sectional elevation of my improved filter. Fig. 2 is a horizontal section thereof, in line 2—2, Fig. 1. Fig. 3 is a similar section in line 3—3, Fig. 1. Fig. 4 is a transverse section of the filter in line 4—4, Fig. 1. Fig. 5 is a detached perspective view of the perforated top plate of the lower filter bed and the oil tube connected therewith. Fig. 6 is a cross section, on an enlarged scale, of one of the exit branches of the oil tube in the water chamber of the filter.

Like letters of reference refer to like parts in the several figures.

A represents a rectangular tank, forming the casing of the filter, and which is divided centrally by a vertical partition A′ into a primary filtering chamber B and a secondary filtering chamber B′. Each of these filtering chambers is preferably provided with an outwardly inclined bottom and at the lower end of the same with a drain cock $b$. The open upper ends of the chambers are closed by the cover C which extends over both chambers.

D is a funnel-shaped receptacle arranged in the upper portion of the primary filtering chamber B and forming a preliminary filtering chamber into which the impure oil is introduced. Within this receptacle is arranged an upper strainer plate $d$ having coarse perforations, a finer strainer $d'$, preferably of gauze, located below the upper strainer plate, and a bed $d^2$ of filtering material, preferably cotton waste, which is confined between the two strainers. The upper strainer plate $d$ arrests any large or coarse impurities contained in the oil, while the bed $d^2$ and gauze strainer $d'$ intercept a portion of the smaller foreign particles which pass the upper coarse strainer. The funnel-shaped receptacle is suspended within the primary filtering chamber by a flange or shoulder $d^3$ arranged at its upper end and resting upon the upper end of the chamber.

E is a second or lower filtering bed arranged within the primary chamber B below the funnel-shaped receptacle D and extending downward to within a short distance of the bottom of the chamber so as to form below said filter bed a settling chamber or compartment E′. The lower filter bed preferably consists of a central layer of powdered charcoal or bone, which is interposed between two layers of hair $e\ e$ and the composite bed so formed is confined between two perforated plates $e'\ e^2$.

F is a descending oil tube or conduit extending from the lower end of the funnel-shaped receptacle to the settling chamber E′ and passing centrally through the lower filter bed and the perforated plates $e'\ e^2$. This oil tube is secured with its upper end to the receptacle D, while its lower end terminates in horizontal branch pipes $f$ from the outer open ends of which the oil issues into the settling chamber. The lower perforated plate $e^2$ is secured to the oil tube by soldering or other means, while the upper plate $e'$ is made vertically movable on the tube so that it may be lifted from the filter bed to afford access thereto for cleaning or renewing it. The plate is attached to the oil tube by a flange or collar $g$ arranged on the tube and bearing against the under side of the plate, and a transverse pin $g'$ secured to the tube above the plate and confining the latter against upward displacement. The upper plate is provided with a slot $h$ which is of sufficient size to permit the pin $g'$ to pass through it when the slot is placed in line with the same. Upon turning the upper plate on the tube so as to bring its slot into register with the pin, the plate may be raised or lowered on the tube, while upon lowering the plate until it rests upon the flange of the tube, and giving it a sufficient turn to bring its slot out of line with the pin, as shown in Figs. 3 and 5, the plate is held against upward movement on the tube.

I is a secondary oil pipe or tube arranged within the secondary filtering chamber B' and which communicates at its upper end with the portion of the primary filtering chamber arranged above the lower filter bed E, and conducts the partially purified oil, which has ascended through said filter bed, into the secondary filtering chamber. The latter is filled with water, or any other liquid of greater specific gravity than oil, nearly to the level of the horizontal branch $i$ of the secondary oil tube, as shown in the drawings. The oil tube is submerged in this body of water and is provided at its lower end with a number of radial branch pipes J which are formed on their under sides with a row of perforations $j$ through which the oil descending through the tube passes into the surrounding body of water. Each branch pipe J is provided on its upper side with a row of pointed, vertical pins or projections $j'$ which are arranged diametrically opposite the perforations on the under side of the pipe, so that the globules of oil, upon issuing from the perforations and rising around opposite sides of the pipe, follow up on the projecting pins, and as these taper upward to a point, the globules diminish in size as they reach the pointed ends of the pins and leave the same in minute particles, thereby exposing a much larger area of the oil globules to the water and thoroughly cleansing the oil.

K is a cock connected with the secondary filtering chamber above its water level for drawing off the purified oil floating on the surface of the water.

L is a gage connected with the water space of the secondary filtering chamber, for observing the height of the water level.

M is an auxiliary inlet or pipe connected with the portion of the primary filtering chamber between its funnel-shaped receptacle and the lower filter bed E. This inlet pipe is provided at its upper end with a funnel $m$ having a hinged lid $m'$.

In the use of the filter, the several stop cocks are closed and the oil to be purified is poured into the funnel-shaped receptacle D after removing the cover C. The oil first descends through the filter bed of this receptacle, which bed intercepts the coarse and light impurities contained in the oil. The oil then passes through the primary tube F and enters the settling chamber E in which the heavier foreign substances, such as metallic particles, are precipitated, while the oil rises and percolates through the lower filter bed E. The latter arrests any comparatively heavy particles not deposited in the settling chamber, while the oil ascends above the filter bed and passes thence into and through the secondary oil tube I. From the latter it issues into the lower part of the secondary filtering chamber and rises through the water in the same, whereby any remaining impurities are washed out of the oil. The purified oil collecting above the surface of the water is drawn off by means of the cock K as before described, while the sediment deposited upon the bottom of the two filtering chambers is drained off through the cocks $b$. When the oil to be filtered is comparatively clear, it may be fed into the filter through the auxiliary inlet M, so as to flow directly through the pipe $i$ into the secondary filtering chamber, without passing through the two filter beds in the primary chamber. The upper filter bed is preferably seated loosely in the funnel-shaped receptacle D so that it can be readily removed for cleaning it upon removing the cover of the filter. The lower filter bed and the primary chamber are readily cleaned by first draining off any oil contained in the chamber through its drain cock and then introducing hot water into the chamber through the auxiliary inlet pipe M, the cleaning water passing through the filter bed into the settling chamber and being discharged through said drain cock. If it is desired to more thoroughly clean the lower filter bed or to renew it, the same is readily removed from the filter by removing the cover C and withdrawing the bed by means of the funnel-shaped receptacle which is connected with the supporting plate of the bed by the oil tube.

I claim as my invention—

1. The combination with the casing of the filter containing a filtering chamber, of a receptacle removably supported in the upper portion of said chamber, a depending oil tube secured at its upper end to the receptacle and provided with a flange or collar and above the latter with a transverse pin, and a filter bed arranged in said chamber below said receptacle and having a lower supporting plate provided with an opening for the passage of said oil tube and an upper plate resting on the flange of the tube and having an opening for the passage of the tube and a slot for receiving the pin of the same, substantially as set forth.

2. The combination with the casing of the filter having an upright partition dividing it into primary and secondary filtering chambers or compartments, of a filter bed arranged in the lower portion of said primary chamber and separated from the bottom of the chamber by a settling chamber, an oil tube or conduit extending from the upper portion of the primary chamber to the settling chamber, an auxiliary inlet arranged outside the filter case and communicating with the upper portion of the primary chamber, and a pipe submerged in the liquid of the secondary filtering chamber and communicating at its lower end with the latter and at its upper end with the upper portion of the primary chamber, substantially as set forth.

3. The combination with the casing of the filter having a filtering chamber adapted to contain a cleansing liquid, of an oil pipe submerged in said chamber and having at its lower portion one or more branches, each provided on its under side with exit openings for the oil and on its upper side, opposite said openings, with solid vertical pins tapering upward to a point, substantially as set forth.

Witness my hand this 31st day of October, 1892.

EDWARD PECK HUNT.

Witnesses:
 EMIL NEUHART,
 THEO. L. POPP.